June 10, 1924.
J. H. LANTERMAN
PISTON RING
Filed Sept. 26, 1923
1,497,106
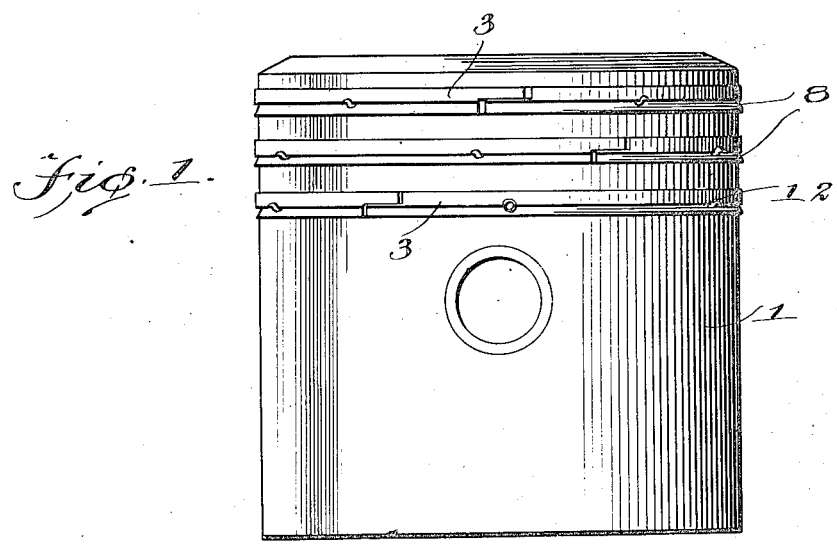
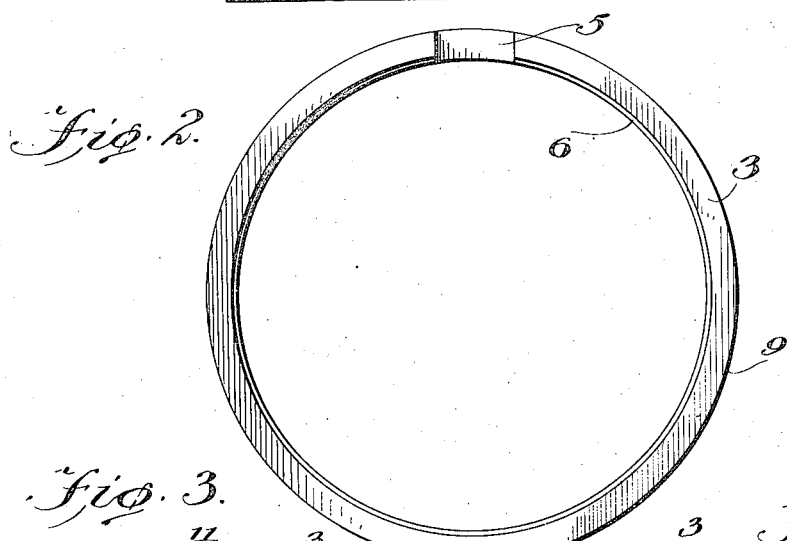
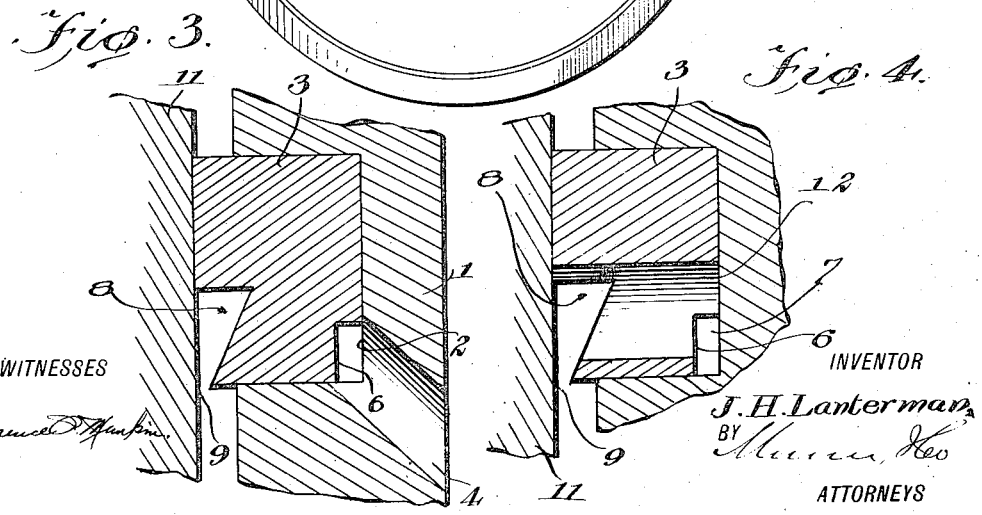
WITNESSES
INVENTOR
J. H. Lanterman
BY
ATTORNEYS Patented June 10, 1924.

1,497,106

UNITED STATES PATENT OFFICE.

JAMES H. LANTERMAN, OF OKLAHOMA CITY, OKLAHOMA.

PISTON RING.

Application filed September 26, 1923. Serial No. 664,989.

*To all whom it may concern:*

Be it known that I, JAMES H. LANTERMAN, a citizen of the United States, and a resident of Oklahoma City, in the State of Oklahoma, have invented certain new and useful Improvements in Piston Rings, of which the following is a specification.

This invention relates to pistons and more particularly to a piston ring for effecting an equal distribution of the lubricating oil.

The principal and most important object of this invention is the provision of a piston having a ring groove therein and a passage leading from the ring groove to its interior, with a new and improved form of piston ring.

Other objects and advantages of the invention will be apparent during the course of the following description.

The invention is illustrated by way of example in the accompanying drawings, in which, Figure 1 is a side elevation of a piston supplied with my improved piston rings.

Figure 2 is a plan view of the piston ring constructed in accordance with my invention.

Figure 3 is a sectional view in detail disclosing the construction of my piston ring and the passages in the piston which connect the ring grooves with the interior of the piston.

Figure 4 is a sectional view in detail disclosing the construction of my piston ring and more particularly the passages for connecting grooves formed in opposite walls of the ring.

Referring to the drawings, 1 designates a piston, the outer walls of which are provided with a plurality of piston ring grooves 2 in which are adapted to be inserted rings 3. Connecting the ring grooves 2 with the interior of the piston are a plurality of passages 4 which extend through the wall of the piston and are inclined downwardly from the rear portion of the grooves 2 toward the opening of the passage in the inner wall of the piston.

Each piston ring comprises a ring of cast iron having its ends in overlapping relation as shown at 5 whereby the free ends of the ring are movable relative to each other.

At the lower edge of the inner periphery of the ring 3 is formed a rectangular rabbet 6 which, when the ring is in position, forms with the vertical and bottom walls of the groove 2 a rectangular oil channel 7. At the lower edge of the outer periphery of the ring 3 is formed a rabbet 8 which is substantially V-shaped in cross section and the ring is so portioned, that above the rabbet 8 the ring projects to contact with the wall 9 of the cylinder, the lower edge of said ring projecting out of the outer surface of the piston 1 and being spaced from the wall 9 of the cylinder 11.

Radially disposed passages 12 connect the rabbet 6 with the rabbet 8 whereby oil collected in the rabbet 8 passes through the radial passages 12 and into the channel 7 of the rabbet 6 located in the inner wall of the ring 3. Oil collected in the rabbet 6 of the ring groove 2 is adapted to drain through the inclined and rearwardly extending passages 4 in the piston 1 to the interior of the piston whence the oil will fall to the bottom of the crank case. The radial passages 12 are of greater height than either of the rabbets to insure free communication between said rabbets.

While I have herein shown and described the preferred form of my invention, it is to be understood that various changes and modifications may be made herein without departing from the spirit of the invention or the spirit and scope of the appended claims.

What I claim is:

1. The combination with a hollow piston having a ring groove and provided with passages leading through the piston wall from the ring groove; of a piston ring having rabbets at its inner and outer lower edges and provided with communicating passages between said rabbets and through the cylinder wall, the inner rabbet being of less height than the outer rabbet, said outer rabbet being V-shaped in cross section and having its inner face at an acute angle at the base of the angle to form a knife edge inwardly spaced from the outer periphery of the ring body and overhanging the outer surface of the piston.

2. The combination with a hollow piston having a ring groove and provided with passages leading through the piston wall from the ring groove; of a piston ring having rabbets at its inner and outer lower edges and provided with communicating passages between said rabbets and through the cylinder wall, said passages being of greater height than said rabbets, said inner rabbet being of less height than the outer rabbet and rectangular in cross section, said outer rabbet being V-shaped in cross section and having its inner face at an acute angle to form a knife edge inwardly spaced from the outer periphery of the ring body and overhanging the outer surface of the piston.

JAMES H. LANTERMAN.